United States Patent
Sharma et al.

(10) Patent No.: US 11,825,340 B2
(45) Date of Patent: *Nov. 21, 2023

(54) MITIGATION OF NEGATIVE DELAY VIA HALF CP SHIFT

(71) Applicant: Parallel Wireless, Inc., Nashua, NH (US)

(72) Inventors: Ajay Sharma, Pune (IN); Somasekhar Pemmasani, Bangalore (IN)

(73) Assignee: Parallel Wireless, Inc., Nashua, NH (US)

(*) Notice: Subject to any disclaimer, the term of this patent is extended or adjusted under 35 U.S.C. 154(b) by 233 days.

This patent is subject to a terminal disclaimer.

(21) Appl. No.: 17/109,136

(22) Filed: Dec. 1, 2020

(65) Prior Publication Data

US 2021/0092636 A1 Mar. 25, 2021

Related U.S. Application Data

(63) Continuation of application No. 16/430,757, filed on Jun. 4, 2019, now Pat. No. 10,856,177, which is a continuation of application No. 15/489,722, filed on Apr. 17, 2017, now Pat. No. 10,313,922.

(60) Provisional application No. 62/322,968, filed on Apr. 15, 2016.

(51) Int. Cl.
*H04W 28/04* (2009.01)
*H04L 27/26* (2006.01)
*H04L 5/00* (2006.01)
*H04L 25/02* (2006.01)

(52) U.S. Cl.
CPC .......... *H04W 28/04* (2013.01); *H04L 5/0007* (2013.01); *H04L 25/0202* (2013.01); *H04L 27/2607* (2013.01); *H04L 27/2665* (2013.01); *H04L 27/2678* (2013.01); *H04L 27/2691* (2013.01)

(58) Field of Classification Search
CPC .. H04W 28/04; H04L 5/0007; H04L 25/0202; H04L 27/2607; H04L 27/2665; H04L 27/2678
See application file for complete search history.

(56) References Cited

U.S. PATENT DOCUMENTS

| 10,313,922 | B2* | 6/2019 | Sharma | H04L 27/2678 |
| 2009/0122731 | A1* | 5/2009 | Montojo | H04L 27/2647 |
| | | | | 370/280 |

(Continued)

*Primary Examiner* — Chi H Pham
*Assistant Examiner* — Weibin Huang
(74) *Attorney, Agent, or Firm* — Michael Y. Saji; David W. Rouille

(57) ABSTRACT

A receiver performing a half cyclic prefix (CP) shift on received subframes is disclosed, comprising: an analog to digital conversion (ADC) module; a cyclic prefix (CP) removal module coupled to the ADC module configured to retain a portion of cyclic prefix samples; a fast Fourier transform (FFT) module configured to receive samples from the cyclic prefix removal module, and to perform a FFT procedure on the received samples using a FFT window, the FFT window being shifted ahead based on the retained portion of cyclic prefix samples, to output an orthogonal frequency division multiplexed (OFDM) symbol; and a rotation compensation module coupled to the FFT module, the rotation compensation module configured to perform phase de-rotation of the OFDM symbol.

9 Claims, 6 Drawing Sheets

(56) References Cited

U.S. PATENT DOCUMENTS

| | | | |
|---|---|---|---|
| 2009/0262851 A1* | 10/2009 | Hoshino | H04B 7/0684 375/267 |
| 2011/0019749 A1* | 1/2011 | Wilhelmsson | H04L 25/022 375/259 |
| 2011/0051862 A1* | 3/2011 | Li | H04L 27/2665 375/343 |
| 2012/0287886 A1* | 11/2012 | Fukuoka | H04L 1/1893 370/329 |
| 2017/0064711 A1* | 3/2017 | Choi | H04W 74/04 |
| 2017/0163457 A1* | 6/2017 | Futatsugi | H04L 27/2607 |
| 2017/0251493 A1* | 8/2017 | Zhang | H04L 27/2628 |

* cited by examiner

MITIGATION OF NEGATIVE DELAY VIA HALF CP SHIFT

CROSS-REFERENCE TO RELATED APPLICATIONS

This application is a continuation under 35 U.S.C. § 120 of U.S. patent application Ser. No. 16/430,757, filed Jun. 4, 2019, and entitled "Mitigation of Negative Delay via Half CP Shift," which itself is a continuation under 35 U.S.C. § 120 of U.S. patent application Ser. No. 15/489,722, filed Apr. 17, 2017, and entitled "Mitigation of Negative Delay via Half CP Shift," which itself is a non-provisional conversion of, and claims the benefit of priority under 35 U.S.C. § 119(e) of, U.S. Provisional Patent Application No. 62/322,968, filed Apr. 15, 2016, and entitled "Mitigation of Negative Delay via Half CP Shift," each of which are hereby incorporated by reference in its entirety for all purposes. Additionally, U.S. Pat. App. Pub. Nos. US20140086120, US20140092765, US20140133456, US20150045063, and US20150078167 are hereby incorporated by reference in their entirety for all purposes.

The following references are also incorporated by reference in their entirety for all purposes: [1] Shaika Mukhtar, "Analytical Review of Orthogonal Frequency Division Multiplexing (OFDM)," International Journal of Advanced Research in Electronics and Communication Engineering (IJARECE) Volume 5, Issue 2, January 2013; [2] http://www.ltecentral.com/2012/03/cyclic-prefix-cp.html; [3] Long Term Evolution IN BULLETS by Chris Johnson; [4] http://www.wirelesscommunication.nl/reference/chaptr04/cellplan/cellsize.htm.

BACKGROUND

Cyclic Prefix (CP) is a technology useful in the implementation of today's 4G technologies, such as Long Term Evolution (LTE) and Worldwide Interoperability for Microwave Access (WIMAX), which function on the principle of Orthogonal Frequency Division Multiplexing (OFDM). When transmitted signals arrive at the receiver by more than one path of different length, the received signals are staggered in time; this is multipath propagation. To mitigate the effect of dispersed channel distortion caused by random channel delay spread, Cyclic Prefix (CP) is introduced to eliminate Inter-Symbol Interference (ISI). However in a scenario of positive delay CP does prove to be useful, but in a case of negative delay, the CP does not aid in the mitigation of ISI considering the FFT window to start at the CP and OFDM symbol boundary. Due to this there can be spillover of the OFDM symbols. Hence causing degradation on the system performance.

SUMMARY

Systems and methods are disclosed for the mitigation of negative delay in OFDM systems.

In a first embodiment, a Long Term Evolution (LTE) receiver is disclosed, comprising: an analog to digital conversion (ADC) module; a cyclic prefix (CP) removal module coupled to the ADC module configured to retain a portion of cyclic prefix samples; a fast Fourier transform (FFT) module configured to receive samples from the cyclic prefix removal module, and to perform a FFT procedure on the received samples using a FFT window, the FFT window being shifted ahead based on the retained portion of cyclic prefix samples, to output an orthogonal frequency division multiplexed (OFDM) symbol; and a rotation compensation module coupled to the FFT module, the rotation compensation module configured to perform phase de-rotation of the OFDM symbol.

The LTE receiver may be part of an LTE small cell base station, LTE femto cell base station, or LTE pico cell base station. The retained portion of cyclic prefix samples may be one half of the samples of a received per-symbol cyclic prefix. The CP removal module may be configured to remove 80 samples from a first OFDM symbol in a leading position in an LTE slot. The CP removal module may be configured to remove 72 samples from a plurality of non-leading position OFDM symbols in an LTE slot. The CP removal module may be configured to remove a different number of samples based on an LTE channel bandwidth, an LTE channel model, an LTE base station coverage area, or an LTE receiver configuration. The LTE receiver may be configured to apply CP sample retention for signals received from an LTE user equipment (UE) operating at a pedestrian speed or vehicular speed. The LTE receiver may be configured to perform channel estimation.

In a second embodiment, a method is disclosed, comprising: receiving an orthogonal frequency division multiplexed (OFDM) radio frame, the OFDM radio frame containing a subframe, the subframe containing a slot; performing analog to digital conversion (ADC) on the slot to generate a sample sequence; performing cyclic prefix (CP) sample removal on the plurality of samples to generate a CP-removed sample sequence; performing a fast Fourier transform (FFT) on the OFDM symbol to generate a symbol; and performing a de-rotation of the symbol, The CP-removed sample sequence contains a portion of a cyclic prefix of the sample sequence.

The OFDM radio frame may be an LTE radio frame. The portion of the cyclic prefix may be half of the cyclic prefix. The method may further comprise outputting a reference symbol and a data symbol. The method may further comprise performing channel estimation on the de-rotated symbol. The method may further comprise equalizing and de-rotating the symbol. The method may further comprise de-rotating the symbol by multiplying by a complex conjugate of a phase ramp $e^{-j2ft}$. The method may further comprise removing 80 samples from a first OFDM symbol in a leading position in an LTE slot. The method may further comprise removing 72 samples from a plurality of non-leading position OFDM symbols in an LTE slot. The method may further comprise removing a different number of samples based on an LTE channel bandwidth, an LTE channel model, an LTE base station coverage area, or an LTE receiver configuration. The method may further comprise performing CP sample removal for signals received from an LTE user equipment (UE) operating at a pedestrian speed or vehicular speed.

DETAILED DESCRIPTION

I. Introduction

For consideration of the problem stated in this paper we highlight the issue based on the LTE 4G system. Orthogonal Frequency Division Multiplexing (OFDM) is a multi-carrier scheme used in modern broadband wireless communication systems to transmit data over a number of orthogonal subcarriers [1]. In the LTE systems, two frame types are supported, namely: Type 1 (used in Frequency Division Duplexing—FDD); and Type 2 (used in Time Division Duplexing—TDD).

OFDMA at the physical layer, in conjunction with a Medium Access Control (MAC) layer, provides optimized resource allocation and quality of service support for different users. Downlink and uplink transmissions are organized into radio frames with frame duration Tf=10 ms duration. The time and frequency domains are organized in a grid of physical resource blocks spanning a number of subcarriers and time slots. A Resource Block (RB) is the smallest unit to which user traffic is allocated (i.e. two users cannot share one RB). In the time domain, RB spans one slot of 0.5 ms duration. The number of OFDM symbols in a slot depends on the cyclic prefix length and configured subcarrier spacing.

Considering a 20 MHz use case the first OFDM symbol will have a CP size of 160 samples for the first OFDM symbol of every slot and 144 sample OFDM symbol 1-6 after the first OFDM symbol.

This disclosure is divided into various sections. Section II gives a basic outline to the importance of CP considering a LTE system as the technology example. It mainly covers the purpose behind CP and how it would assist in the mitigation of ISI. Section III states the problem statement of the paper which is negative timing offset it however covers positive timing offset as well. It provides a graphical view of the issue described. Section IV explains the proposed method of dealing with negative timing offset. A graphical view of the problem and the solution is provided. Section V provides a flowchart and implementation of the proposed solution. It considers and example of a LTE system of 20 MHz as an example. Section VI describes an exemplary hardware embodiment.

Figure 1:
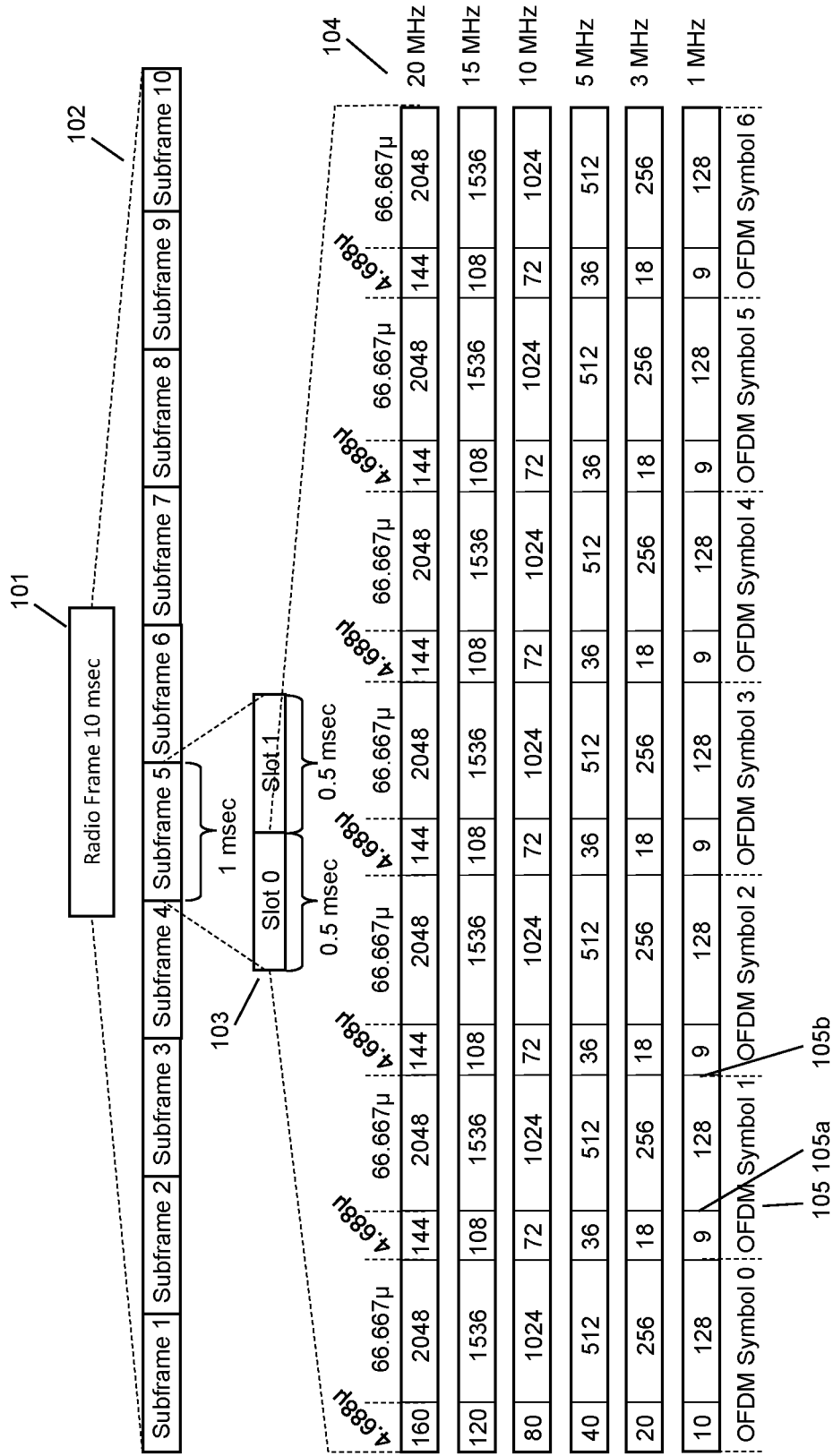
FIG. 1 is a schematic diagram of an LTE subframe, in accordance with some embodiments.

FIG. 1 is a schematic diagram of an LTE subframe, in accordance with some embodiments. Radio frame 101 represents a 10 msec radio frame. Radio frame 101 is made up of 10 subframes 102, each 1 msec in duration. Each subframe is made up of two slots 103, slot 0 and slot 1, equal in length at 0.5 msec. Each slot contains a number of OFDM symbols. Symbol 105 includes an initial portion 105*a*, denoting the CP top and having a duration of 4.688 μsec, and a subsequent portion 105*b*, denoting the useful symbol Tg and having a duration of 66.667 μsec. A number is shown in the block denoting the portions; this number is a number of samples as sampled by the radio receiver. The number of samples depends on the channel bandwidth. Channel bandwidths 104 of 20 MHz, 15 MHz, 10 MHz, 5 MHz, 3 MHz, and 1 MHz, together with the appropriate number of samples, is shown in the figure. The number of resource blocks (RBs) and the sampling frequency is shown below in Table 1, together with the CP length. Two CP lengths are commonly used, a first length for Symbol 0 (the first symbol in an LTE slot) and a second, shorter length for Symbol 1. Although the specific number of samples, etc. are shown below for LTE, the same principles could be applied to any OFDM symbol, which may have different sampling rates, etc.

TABLE 1

Overview of LTE Numerology

| | Channel Bandwidth | | | | | |
|---|---|---|---|---|---|---|
| | 20 MHz | 15 MHz | 10 MHz | 5 MHz | 3 MHz | 1.4 MHz |
| Frame Duration | 10 ms | | | | | |
| Subframe Duration | 1 ms | | | | | |
| Slot Duration | 0.5 ms | | | | | |
| Symbol Duration | 66.667 us | | | | | |
| Number of RB's | 100 | 75 | 50 | 25 | 15 | 6 |
| IFFT(Tx)/FFT size(Rx) | 2048 | 1536 | 1024 | 512 | 256 | 128 |
| Sampling frequency (sampling rate) | 30.72 | 23.04 | 15.36 | 7.68 | 3.84 | 1.92 |
| Cyclic Prefix Length for Short Tcp = 5.21 μs Symbol 0 Tcp = 4.69 μs Symbol 1-6 | 160/144 | 120/108 | 80/72 | 40/36 | 20/18 | 9/10 |

II. Basics of Cyclicprefix

Cyclic Prefix by its name is evident that cyclic indicates that, the CP maintains a repeated nature of something and prefix says it is added at the beginning. The motivation for adding the cyclic extension is to avoid inter-symbol interference (ISI). "When the transmitter adds a cyclic extension longer than the channel impulse response, the effect of the previous symbol can be avoided by removing the cyclic extension at the receiver" [2]. The CP represents a guard period at the start of each OFDMA symbol which provides protection against multi-path delay spread. The CP also represents an overhead which should be minimized ([3]).

Figure 2:
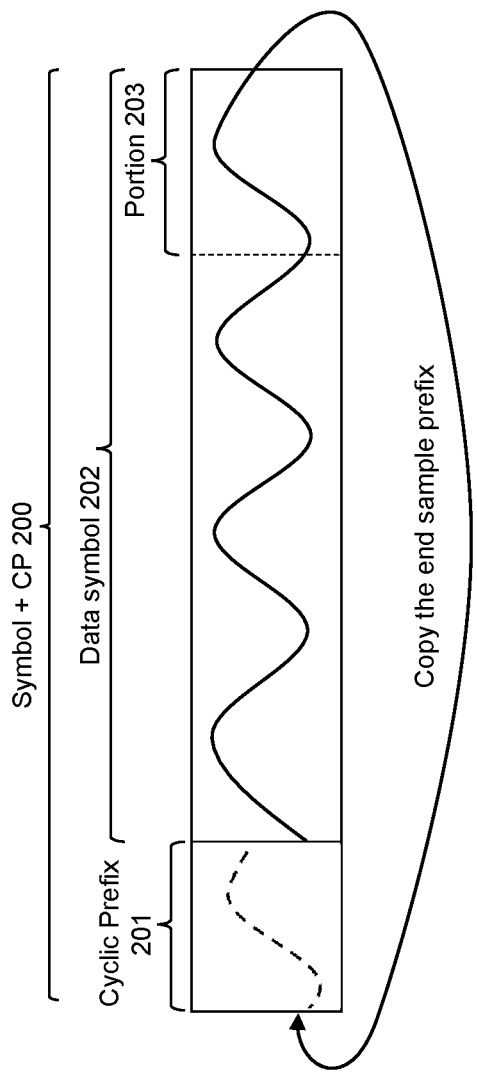
FIG. 2 is a schematic diagram of an LTE symbol with cyclic prefix, in accordance with some embodiments.

FIG. 2 is a schematic diagram of an LTE symbol with cyclic prefix, in accordance with some embodiments. Generation of the cyclic prefix is shown schematically. A single OFDM symbol 200 is shown, made up of CP 201, data symbol 202, and end portion 203. The cyclic prefix 201 is generated by copying the end portion 203 of the main body of the OFDM symbol 202 on to the front of the main body. The OFDM symbol duration is defined as Ts=Tu+Tcp, where Tcp is the guard interval or cyclic prefix. When the guard interval is longer than the channel impulse response or the multipath delay, the ISI can be effectively eliminated.

The delay spread considered for LTE system is given in Table 2. Considering the case of extended typical urban (ETU) the delay spread mentioned is of 991 ns~(1 μs) and the CP size 5.208 μs. From here we can see that CP size is approximately 5 times that of the delay spread. This reduces the likelihood that multiple path issues will arise. 3GPP document 36.101 v10.8.0 is hereby incorporated by reference in its entirety.

TABLE 2

Delay Profiles for LTE Channel Models

| Model | Number of Channel Taps | Delay Spread (rms) |
| --- | --- | --- |
| Extended pedestrian A (EPA) | 7 | 45 ns |
| Extended vehicular A (EVA) | 9 | 357 ns |
| Extended typical urban (ETU) | 9 | 991 ns |

III. Effects of Time Offset

A. Ideal Case with No Time Offset.

Figure 3:
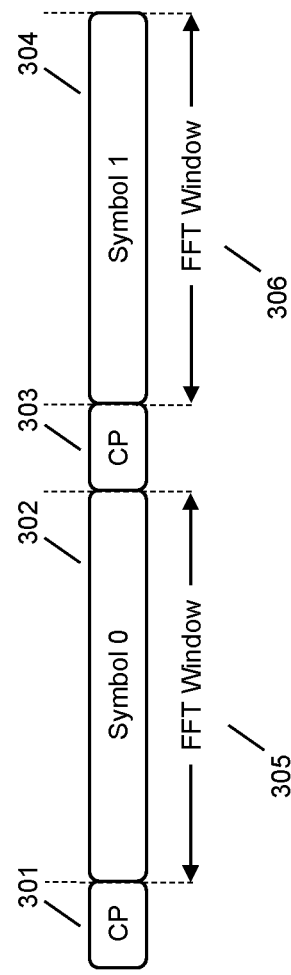
FIG. 3 is a schematic diagram of an LTE symbol with no timing offset, in accordance with some embodiments.

FIG. 3 is a schematic diagram of an LTE symbol with no timing offset, in accordance with some embodiments, showing symbol boundaries. In an ideal condition where there is no TO (Timing Offset) inter-symbol interference will not be observed. Here the FFT windows boundaries shown would not see any symbol overlaps as can be seen in FIG. 3. Two symbols, symbol 0 302 and symbol 1 304 are shown, each with its own cyclic prefix 301 and 303, respectively. The FFT window for symbol 0 is shown as window 305. The FFT window for symbol 1 is shown as window 306. Windows 305 and 306 align with the boundaries of symbols 302 and 304, respectively, as there is no time offset. Samples of the cyclic prefixes are not needed for the FFT computation, again due to a lack of time offset.

Since there is no overlap at the symbol level the CP can be discarded and only the symbol can be considered for FFT. There will be no distortion or loss of information allowing the system to behave in well synchronized manner.

B. Positive Time Offset.

Figure 4:
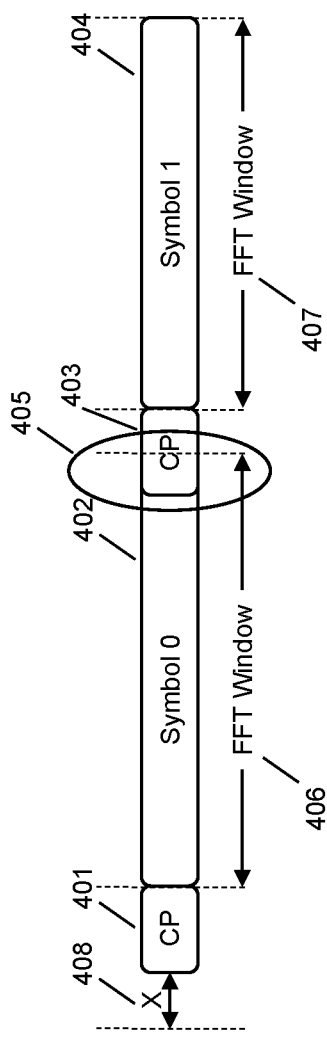
FIG. 4 is a schematic diagram of an LTE symbol with positive timing offset, in accordance with some embodiments.

In a condition of positive delay as seen in FIG. 4, symbol 0 can arrive late in time due to multipath. Since multiple replicas of the same signal travelling by different paths would arrive at different time periods this would cause symbol 0 to spill into symbol 1. However due to the CP of symbol 1, symbol 1 will not observe any form of ISI effect. The CP length would be sufficient enough to absorb the overlap of symbol 0.

FIG. 4 is a schematic diagram of an LTE symbol with positive timing offset, in accordance with some embodiments, showing symbol boundaries. Two symbols, symbol 0 402 and symbol 1 404 are shown, each with its own cyclic prefix 401 and 403, respectively. Symbol 0 has arrived x ms late, shown as time period 408, perhaps due to multipath. The FFT window for symbol 0 is shown as window 406. The FFT window for symbol 1 is shown as window 407. Window 406 does not align with symbol 0; rather, since symbol 0 has arrived x ms late, window 406 extends into cyclic prefix 403. This overlap is shown as circled area 405.

In FIG. 4 we consider that symbol 0 has arrived late in time, here shown as x ms late, this will inherently cause a phase rotation in the frequency domain causing the channel estimates to be slightly rotated. Due to the CP the ISI can be mitigated to a certain degree of positive delay. If the timing offset if higher than the CP length, then the symbols can overlap which is hardly the case as CP length is calculated on the bases of rms (root mean square) delay spread.

C. Negative Time Offset.

Figure 5:
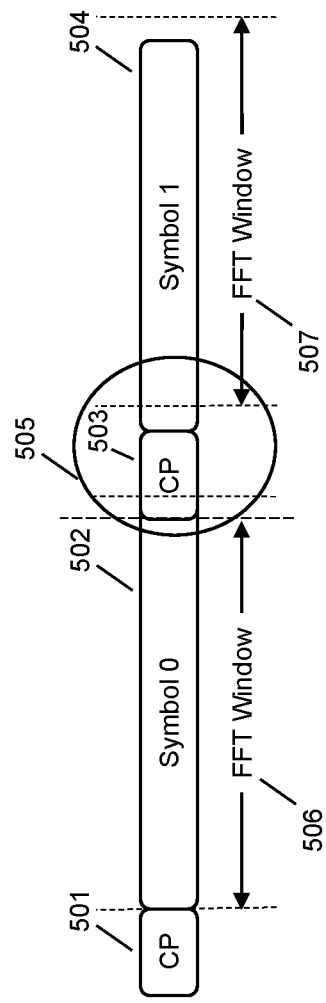
FIG. 5 is a schematic diagram of an LTE symbol with negative timing offset, in accordance with some embodiments.

In a condition of negative delay as seen in FIG. 5, symbol 1 arrives before its FFT window starts. This issue would cause an ISI effect to symbol 0, as the CP of symbol 1 would spill into the symbol 0 region as circled in FIG. 5.

FIG. 5 is a schematic diagram of an LTE symbol with negative timing offset, in accordance with some embodiments, showing symbol boundaries. Two symbols, symbol 0 502 and symbol 1 504 are shown, each with its own cyclic prefix 501 and 503, respectively. Symbol 1 has arrived early, such that its CP samples arrive during the symbol 0 region. The spillover of symbol 1 is shown as circled area 505. The FFT window for symbol 0 is shown as window 506. The FFT window for symbol 1 is shown as window 507. Window 506 is aligned with symbol 0; however, since symbol 1 has arrived early, part of the CP of symbol 1 extends into symbol 0's window 506.

Another issue also faced would be the FFT window for symbol 1 will start at its predefined timing. Due to this certain level of data samples of symbol 1 would get dropped causing loss of information samples. This issue would make symbol 0 and symbol 1 difficult to decode causing a huge impact in the system performance which is unacceptable. Such a scenario can occur when symbol boundaries have been shaken due to early attach or UE out of sync.

IV. Method of Mitigation of Negative Time Offset

Figure 6:
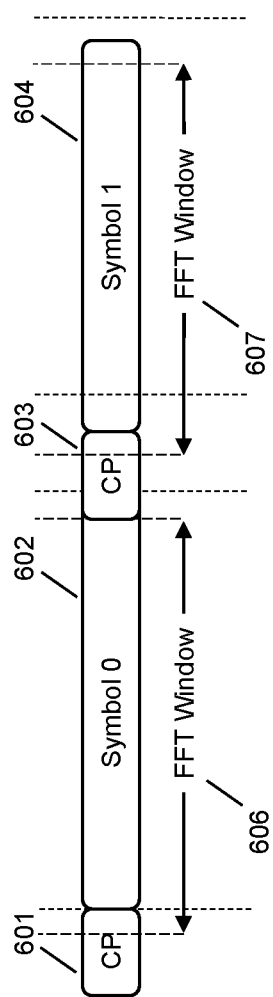
FIG. 6 is a schematic diagram of an LTE symbol showing CP shift to mitigate negative time offset, in accordance with some embodiments.

FIG. 6 is a schematic diagram of an LTE symbol showing CP shift to mitigate negative time offset, in accordance with some embodiments. Two symbols, symbol 0 602 and symbol 1 604 are shown, each with its own cyclic prefix 601 and 603, respectively. The FFT window for symbol 0 is shown as window 606. The FFT window for symbol 1 is shown as window 607. Negative timing offset is present, such that symbol 1 has arrived early and its CP samples arrive during the symbol 0 region. If left uncorrected, this may result in ISI effects on symbol 0.

The issue described in section C of Section III can have a significant effect on the overall system performance. The DMRS symbol can get corrupted with the OFDM symbol of previous symbol. Hence not allowing channel estimates to be computed accurately. Leading to an issue of improper equalization of the data symbols and incorrect measurement calculations.

To be able to handle this issue a Half CP shift mechanism can be taken into consideration as explained above. The Half CP shift shifts the FFT window for symbol 602, window 606, by half the CP length. Hence this means that FFT for window 606 is performed ahead of time. The question is by how much time? The FFT window time can be shifted by approximately Half CP. The advancement of the FFT window would cause a phase rotation in the frequency domain for symbol 0 but saving symbol 0 from ISI as can be seen in FIG. 6. The Half CP rotation that has happen in frequency domain can be de-rotated back easily. This can be achieved by multiplying the constant phase shift on each carrier. By moving the FFT window 606, it can be seen that although symbol 1 604 experiences a spillover into the CP region of symbol 1, 603, this spillover into the CP region of symbol 1 will still be safe as the CP is discarded.

This half-CP shift is not suggested for generation of LTE symbols. Rather, the disclosed method is for a receiver, to be designed to remove half of a CP as part of a received OFDM symbol, to cater to any misalignment of UE in terms of timing advance. This differs from the typical behavior of an eNodeB or base station receiver, in which the entire CP is removed when the signal is received prior to processing the rest of the OFDM symbol for decoding.

Generally, timing advance (TA) corrections are performed at the UE as instructed by the eNodeB or base station. Sometimes a UE will be misaligned to a symbol boundary, such as in scenarios where no transmission is performed on uplink (as no transmission results in no TA correction), due to DRx and wrong TA calculation. Such scenarios will result in degraded overall system performance. The disclosed systems and methods mitigate this effect.

V. Block Diagram and Implementation

Figure 7:
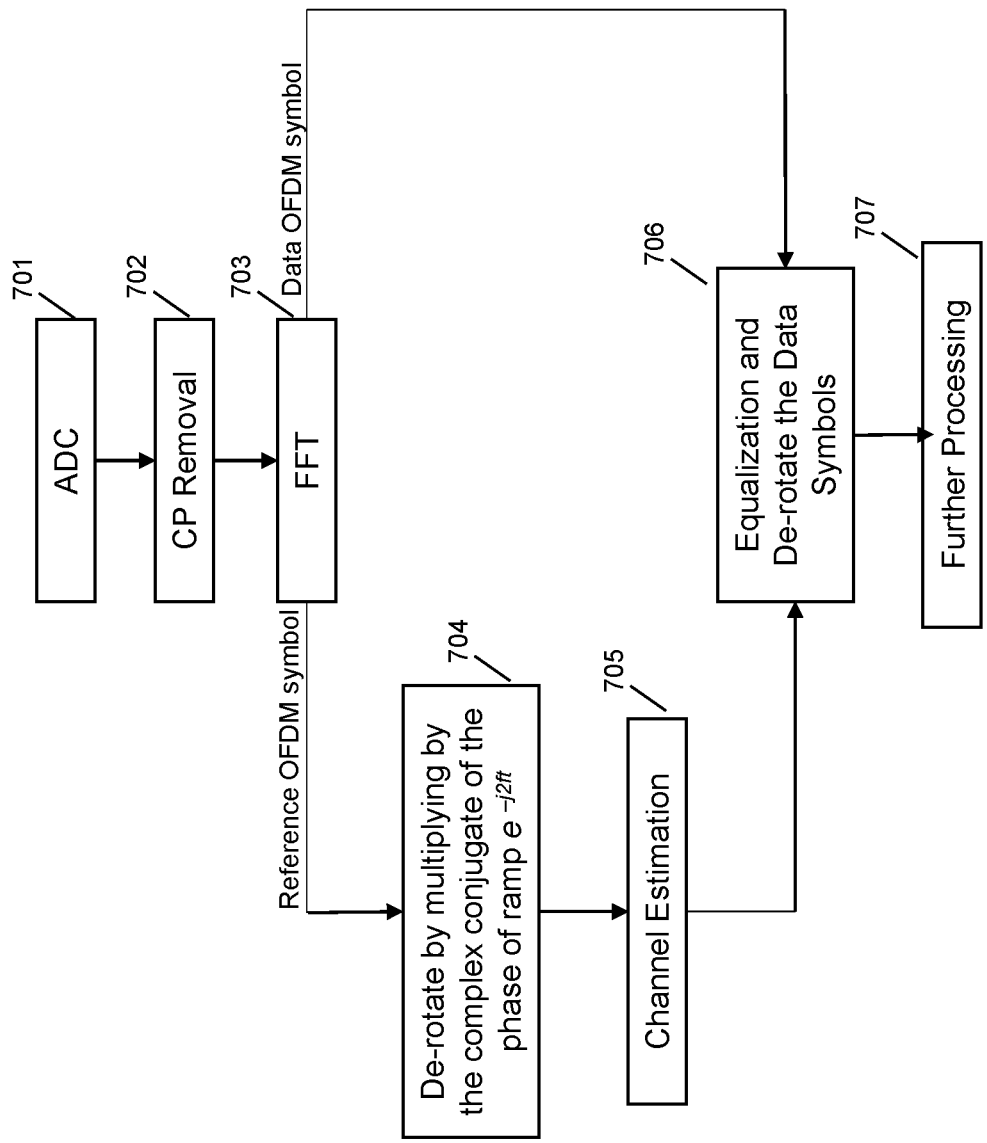
FIG. 7 is a schematic diagram of an LTE receiver block, in accordance with some embodiments.

FIG. 7 is a schematic diagram of an LTE receiver block, in accordance with some embodiments. At block 701, an analog to digital converter (ADC) receives baseband radio signals and converts them to digital samples. At block 702, the cyclic prefixes are removed; instead of complete removal of CP for every assumed symbol, in the present disclosure a subset, such as half, of the CP is removed. The output samples should constitute the data symbol, and are passed to a FFT block 703. At this stage the symbol may be rotated due to moving up the FFT window. As shown, the FFT block 703 outputs two symbols, a reference OFDM symbol and a data OFDM symbol, which goes to block 706. The reference OFDM symbol is passed to a de-rotate block 704, where it is de-rotated by multiplying by the complex conjugate of the phase of ramp $e^{j2ft}$. The de-rotated block is passed to channel estimation block 705. Once channel estimation is performed, equalization and de-rotation of the data symbols is performed at block 706. Further processing, such as output to an LTE Layer 2 PHY, occurs at block 707.

Consider FIG. 7 as a LTE receiver block. In an ideal case the CP removal would drop 160 samples for the first OFDM symbol and 144 samples for every other OFDM symbol of a slot in a 20 MHz LTE system. After which the rest of the sample of the OFDM symbol would be passed over to perform FFT. Here the FFT window shall begin right at the boundary of the CP and OFDM Symbol. In the case of negative timing offset the mechanism described section IV states that the FFT window is started in advance by certain samples. The CP removal in the block figure will only drop 50% of the CP samples. Hence this would mean that in a 20 MHz LTE system instead of 160/144 samples getting dropped instead 80/72 samples will get dropped. The end 80/72 samples of the OFDM symbols will not be considered in the FFT. One would believe that the 80/72 samples getting dropped off at the end of the OFDM symbol would result in loss of information. But from section II it is quite clear that CP contain a copy of the 160/144 samples of the end of the OFDM symbol which is copied at the beginning. Hence there is no loss of information. Instead there would arise a phase rotation which can be de rotated at the time of Channel Estimation of the DMRS OFDM symbol and Equalization for the Data OFDM symbols.

In some embodiments, it is recognized that the benefit of half-CP shifting is obtained in the case of negative delay. Therefore, two modes of operation are contemplated, in some embodiments: a normal mode and a half-CP shifted mode. The half-CP shifted mode may be entered when a negative delay is detected or expected. Detection of a negative delay may cause the system to dynamically enter into the half-CP shifted mode. Detection may include the use of a threshold to enter the half-CP shifted mode. Once a channel no longer exhibits a negative delay, in some cases detected by delay falling below a threshold, the half-CP shifted mode may subsequently be exited. In some embodiments, the phase or rotation of the OFDM symbols may be determined and used to determine whether a signal is negatively or positively delayed; this may be performed in the same module as the half CP shifting.

From section II it is clear that considering only 50% of the complete CP size as the actual CP would not have a considerable negative impact on a femtocell/picocell system, as the coverage area is small, being in the range of 10-200 meters [4]. However, for a macro based system were the coverage area is much larger in the range 1 to 20 km, CP size reduction could result in ISI effect during positive timing offset. Hence this method may prove to be advantageous where coverage areas are small.

The proposed method has been tested and implemented in a real LTE 4G system over PSC 913x processors for baseband LTE Pico/Femto systems. The proposed method however comes with a drawback of increase cycle count. As an addition operation de-rotation is needed to be done at each OFDM symbol.

VI. Exemplary Hardware

Figure 8:
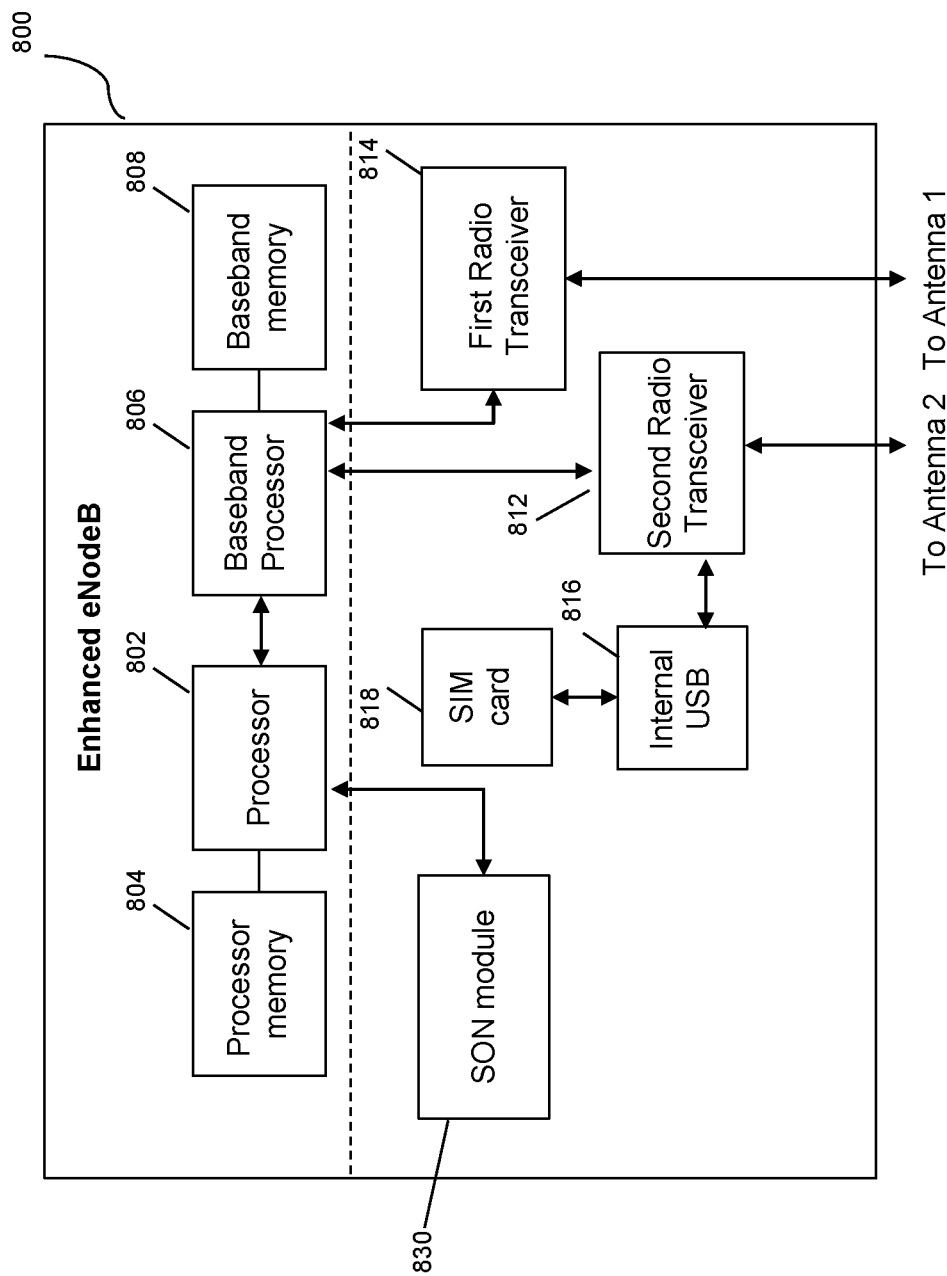
FIG. 8 is a schematic diagram of an enhanced eNodeB, in accordance with some embodiments.

FIG. 8 is a schematic diagram of an enhanced eNodeB, in accordance with some embodiments. Enhanced eNodeB 800 may include processor 802, processor memory 804 in communication with the processor, baseband processor 806, and baseband processor memory 808 in communication with the baseband processor. Enhanced eNodeB 800 may also include first radio transceiver 810 and second radio transceiver 812, internal universal serial bus (USB) port 816, and subscriber information module card (SIM card) 818 coupled to USB port 814. In some embodiments, the second radio transceiver 812 itself may be coupled to USB port 816, and communications from the baseband processor may be passed through USB port 816.

A self-organizing network (SON) module 830 may also be included, which may include a database (not shown), in some embodiments, or which may be in communication with a coordination server (not shown), in some embodiments, or both, in some embodiments.

Processor 802 and baseband processor 806 are in communication with one another. Processor 802 may perform routing functions, and may determine if/when a switch in network configuration is needed. Baseband processor 806 may generate and receive radio signals for both radio transceivers 810 and 812, based on instructions from processor 802. In some embodiments, processors 802 and 806 may be on the same physical logic board. In other embodiments, they may be on separate logic boards.

The first radio transceiver 810 may be a radio transceiver capable of providing LTE eNodeB functionality, and may be capable of higher power and multi-channel OFDMA. The second radio transceiver 812 may be a radio transceiver capable of providing LTE UE functionality. Both transceivers 810 and 812 are capable of receiving and transmitting on one or more LTE bands. In some embodiments, either or both of transceivers 810 and 812 may be capable of providing both LTE eNodeB and LTE UE functionality. Transceiver 810 may be coupled to processor 802 via a Peripheral Component Interconnect-Express (PCI-E) bus, and/or via a daughtercard. Transceiver 810 may have its L1 (PHY), L2 (MAC), and other layers implemented using software modules that are configured to run on processor 802, as described herein.

Transceiver 812 may be for providing LTE UE functionality, in effect emulating a user equipment, it may be connected via the same or different PCI-E bus, or by a USB bus, and may also be coupled to SIM card 818. SIM card 818 may provide information required for authenticating the simulated UE to the evolved packet core (EPC). When no access to an operator EPC is available, a local EPC on the enhanced eNodeB itself (not shown) may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 800 is not an ordinary UE but instead is a special UE for providing backhaul to device 800.

Alternatively, transceiver 812 may be another radio access technology (RAT) radio, such as a 2G, 3G, 4G, 5G, or Wi-Fi radio. Transceivers 810 and 812 may have different RATs or the same RAT. As each RAT and as each radio has its own PHY, the concepts and methods described herein could be used for 2G, 3G, 4G, 5G, or Wi-Fi PHY and MAC layer error messaging, or a combination of multiple RAT layer error messaging modules.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 810 and 812, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 802 for reconfiguration.

Other elements and/or modules may also be included, such as a home eNodeB, a local gateway (LGW), or another module. Additional radio amplifiers, radio transceivers and/or wired network connections may also be included.

Processor 802 may identify the appropriate network configuration, and may perform routing of packets from one network interface to another accordingly. Processor 802 may use memory 804, in particular to store a routing table to be used for routing packets. Baseband processor 806 may perform operations to generate the radio frequency signals for transmission or retransmission by both transceivers 810 and 812. Baseband processor 806 may also perform operations to decode signals received by transceivers 810 and 812. Baseband processor 806 may use memory 808 to perform these tasks.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

Those skilled in the art will recognize that multiple hardware and software configurations could be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention could be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment.

The embodiments disclosed herein can be used with a variety of protocols so long as there are OFDM symbols with cyclic prefixes. Although the method described assumes an LTE system, the techniques described can also be extended to other wireless systems that use OFDM symbols, such as 5G, IEEE 802.11a, g, n, ac, 802.16E, 802.20, HIPERLAN/2, DAB/DAB+, DVB-T/H, WiMAX, etc.

In any of the scenarios described herein, processing may be performed at the cell (base station), or at a UE, or at a relay node, or a mesh node, or at a baseband processing node; the processing may also be performed in coordination with a cloud coordination server. The eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, in various orders as necessary.

In some embodiments, the software needed for implementing the methods and procedures described herein may be implemented in a high level procedural or an object-oriented language such as C, C++, C#, Python, or Java. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A non-transitory computer-readable medium containing instructions which, when executed, cause a system to perform steps comprising:

receiving an orthogonal frequency division multiplexed (OFDM) radio frame, the OFDM radio frame containing a subframe, the subframe containing a slot;

performing analog to digital conversion (ADC) on the slot to generate a sample sequence;

performing cyclic prefix (CP) sample removal on the plurality of samples to generate a CP-removed sample sequence;

performing a fast Fourier transform (FFT) on the OFDM symbol using a shifted window to generate a symbol; and performing a de-rotation of the symbol by multiplying the symbol by a complex conjugate of a phase ramp $e^{-j2ft}$, wherein the CP-removed sample sequence contains a portion of a cyclic prefix of the sample sequence.

2. The non-transitory computer-readable medium of claim 1, further containing instructions wherein the OFDM radio frame is a 5G radio frame or an LTE radio frame.

3. The non-transitory computer-readable medium of claim 1, further containing instructions wherein the portion of the cyclic prefix is half of the cyclic prefix.

4. The non-transitory computer-readable medium of claim 1, further containing instructions for outputting a reference symbol and a data symbol.

5. The non-transitory computer-readable medium of claim 1, further containing instructions for performing channel estimation on the de-rotated symbol.

6. The non-transitory computer-readable medium of claim 1, further containing instructions for equalizing and de-rotating the symbol.

7. The non-transitory computer-readable medium of claim 1, further containing instructions for removing 80 samples from a first OFDM symbol in a leading position in a slot.

8. The non-transitory computer-readable medium of claim 1, further containing instructions for removing 72 samples from a plurality of non-leading position OFDM symbols in a slot.

9. The non-transitory computer-readable medium of claim 1, further containing instructions for removing a different number of samples based on a channel bandwidth, a channel model, a base station coverage area, or a receiver configuration.

* * * * *